United States Patent
Ballantine

(10) Patent No.: US 8,445,150 B2
(45) Date of Patent: May 21, 2013

(54) GRID FREQUENCY-RESPONSIVE SOLID OXIDE FUEL CELL SYSTEM

(75) Inventor: Arne Watson Ballantine, Palo Alto, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 863 days.

(21) Appl. No.: 12/458,342

(22) Filed: Jul. 8, 2009

(65) Prior Publication Data
US 2011/0008696 A1    Jan. 13, 2011

(51) Int. Cl.
*H01M 8/04* (2006.01)

(52) U.S. Cl.
USPC .......................................... 429/428; 429/430

(58) Field of Classification Search
USPC .................... 429/428, 430, 431, 432
See application file for complete search history.

(56) References Cited

U.S. PATENT DOCUMENTS

| | | | |
|---|---|---|---|
| 4,317,049 A | 2/1982 | Schweppe | |
| 6,498,462 B2 | 12/2002 | Ballantine et al. | |
| 6,757,590 B2 * | 6/2004 | Ross et al. | 429/432 X |
| 7,149,605 B2 | 12/2006 | Chassin et al. | |
| 7,250,231 B2 * | 7/2007 | Edlund | 429/430 X |
| 7,261,962 B1 * | 8/2007 | Czajkowski et al. | 429/430 X |
| 7,274,111 B2 | 9/2007 | Andrew et al. | |
| 7,422,810 B2 | 9/2008 | Venkataraman et al. | |
| 7,482,078 B2 | 1/2009 | Sridhar et al. | |
| 2004/0048115 A1 | 3/2004 | Devos | |
| 2004/0048118 A1 | 3/2004 | Nakaji et al. | |
| 2004/0202914 A1 * | 10/2004 | Sridhar et al. | 429/34 |
| 2006/0083955 A1 | 4/2006 | Kanouda et al. | |
| 2008/0102322 A1 | 5/2008 | Pearson | |
| 2008/0297113 A1 | 12/2008 | Saeki et al. | |

OTHER PUBLICATIONS

Lazarewicz, Matthew L., et al., "Grid Frequency Regulation by Recycling Electrical Energy in Flywheels", IEEE Power Engineering Soc. General Meeting Proc., Jun. 10, 2004, vol. 2, pp. 2038-2042.
International Preliminary Report on Patentability issued in PCT Application PCT/US2010/041179, mailed on Jan. 19, 2012.
International Search Report in PCT Application PCT/US2010/041179, mailed on Feb. 11, 2011.

* cited by examiner

*Primary Examiner* — Stephen J. Kalafut
(74) *Attorney, Agent, or Firm* — The Marbury Law Group PLLC

(57) ABSTRACT

A method for operating a fuel cell system connected to a power grid includes determining a frequency of the power grid, and adjusting the operation of the fuel cell system based on the determined frequency.

29 Claims, 3 Drawing Sheets

GRID FREQUENCY-RESPONSIVE SOLID OXIDE FUEL CELL SYSTEM

BACKGROUND

The following description is provided simply as an aid in understanding the disclosure and is not admitted to describe or constitute prior art.

The present invention relates generally to optimally operating electric power grids, and more particularly, to methods and systems for operating solid oxide fuel cell systems (SOFCS) in concert with electric power grids.

Electric power grids typically include a number of power generating systems, such as SOFCS, that supply electricity to the grid and a number of consumers that draw electricity from the grid. When the generation and consumption of electricity are substantially equal, the grid frequency is substantially constant at a particular nominal value. This is the preferred state for optimal efficiency and functionality. The nominal grid frequency is a parameter established by the governing power distribution entity. Examples of nominal standard grid frequencies for the European and North American systems are 50 Hz and 60 Hz respectively.

Transient frequency deviations result from changes in energy consumption and/or the removal or addition of power generation systems. Decreased consumption or increased generation tends to cause an increase in the grid frequency, and vice versa. Power consumption and generation are time-dependent variables which may cause short—i.e., measured in second or minutes—deviations of small magnitude. Larger frequency transients, such as those having a magnitude of greater than 0.3 Hz, may be due to the sudden loss of a significant power generator.

One known way to mitigate the frequency transient magnitude and duration is to have some amount of standby power generation capacity, sometimes referred to as a system reserve. A spinning reserve is an aspect of the system reserve that is derived from already operating generators and is readily deployable. For example, a spinning reserve can be defined as any back-up energy production capacity which can be made available to a transmission system with short notice and can operate continuously for several hours once it is brought online. Frequency generation is often managed by varying the output of fossil fuel-fired generators connected to the electric grid. Not all generators can be effectively operated with constantly varying output, and those that are thus operated incur costs from increased fuel consumption and maintenance. Additional conventional solutions include rapid deployment or removal of load, or added transmission power from other grids. Accordingly, there is a need for both rapidly responsive reserve capacity, and methods and means for utilizing excess power during periods of low consumption by end users.

Solid oxide fuel cells are electrochemical devices that convert chemical energy produced by a reaction directly into electrical energy. Reversible or regenerative cells may also do the reverse, consuming electricity and converting chemicals in a reaction to produce hydrogen gas—i.e., electrolyzing steam. Multiple fuel cells may be assembled together to form an arrangement called a fuel stack. The fuel cell stack may include interconnects/gas separator plates for routing reactants and products through the stack. An example of a fuel cell system is described in U.S. Pat. No. 7,422,810, which is incorporated herein by reference in its entirety. Parameters such as temperature, reactant type and flow rate are determined by a controller, which thereby regulates the type and magnitude of the fuel cell stack output.

SUMMARY OF THE INVENTION

One embodiment of the invention relates to electrically coupling a SOFCS to a power grid and operating the SOFCS responsive to grid frequency. A reversible SOFCS ("SORFCS") may be operated in either fuel cell mode or electrolyzer mode responsive to grid frequency. The grid frequency is provided either by a sensor and/or is communicated by a grid control center. A deviation in grid frequency below a predetermined lower threshold initiates an output or an increase in the existing output level of the SOFCS power to the grid. Conversely, a deviation above a predetermined upper threshold leads to a stoppage or a decrease in the existing output level of the SOFCS power to the grid. For a SORFCS, the output state of the SORFCS may be switched from electricity output in the fuel cell mode to hydrogen generation in electrolyzer mode.

It is to be understood that both the foregoing general description and the following detailed description are exemplary and explanatory only, and are not restrictive of the claimed subject matter.

BRIEF DESCRIPTION OF THE DRAWINGS

Features, aspects and advantages of the present invention will become apparent from the following description, appended claims, and the accompanying exemplary embodiments shown in the drawings, which are briefly described below.

DETAILED DESCRIPTION

Embodiments of the disclosure will be described below with reference to the accompanying drawings. It should be understood that the following description is intended to describe exemplary embodiments, and not to limit the claimed subject matter.

Figure 1:
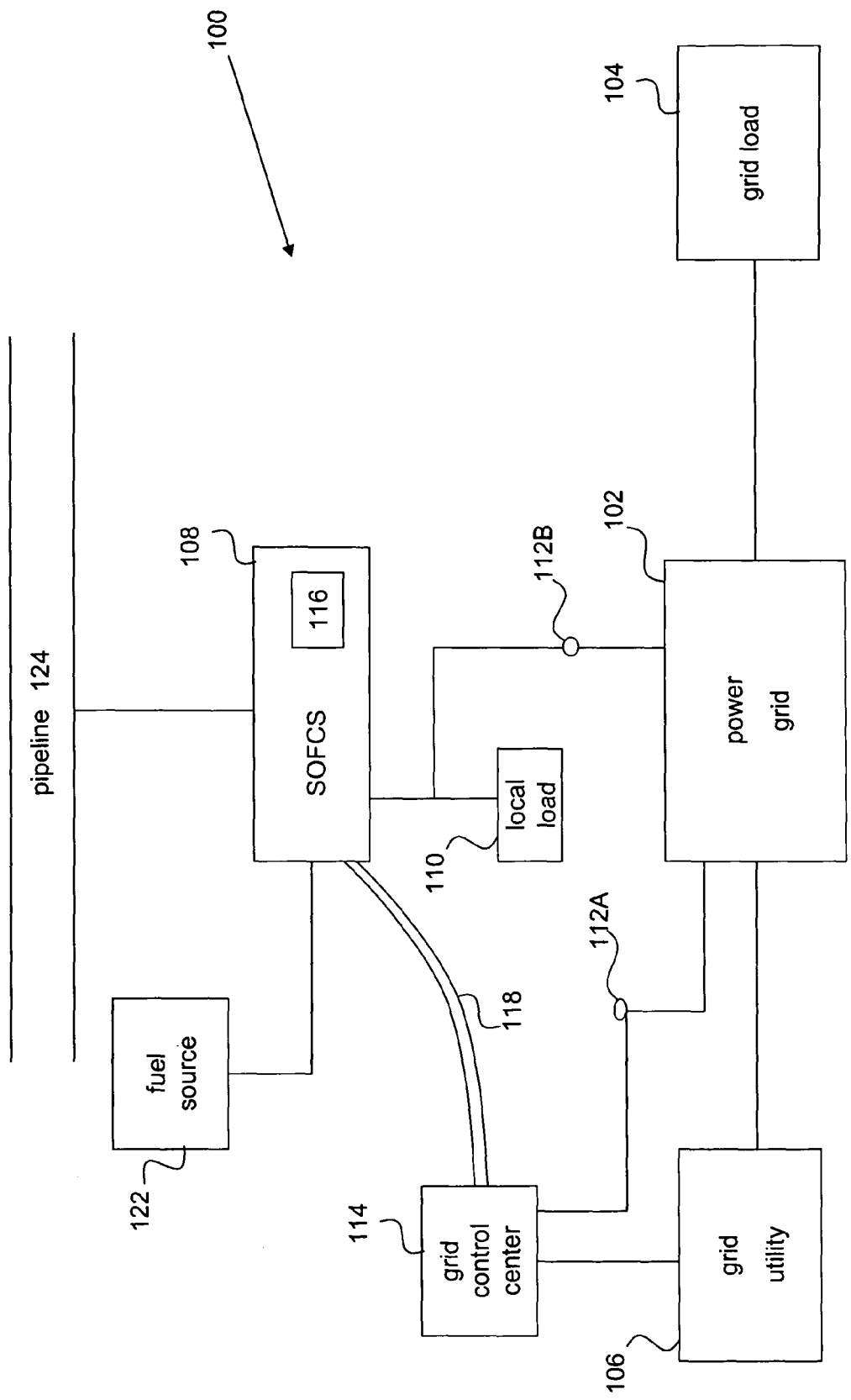
FIG. 1 is a schematic diagram of a power distribution system according to an embodiment of the invention.

FIG. 1 is a schematic illustration of an exemplary power distribution system 100. The power distribution system 100 includes a power grid 102 that communicates power to grid loads 104, which may include various industrial and residential power consuming devices. A grid utility 106 and an auxiliary power generator 108, such as a SOFC power generation system, provide power to the power grid. While a solid oxide fuel cell system is described herein as the power generator 108, other fuel cell systems, such as PEM, phosphoric acid, molten carbonate, etc., system may also be used. Additionally, other renewable electricity generation systems, such as photovoltaic (solar), wind turbine, geothermal, etc., may be used together with or instead of the SOFCS. The grid utility 106 is controlled by a grid control center 114 such as an Independent Systems Operator or Regional Transmission Organization, or the like. While one power generator, such as SOFCS 108 is shown in FIG. 1, it should be noted that there may be plural systems 108. The SOFCS 108 may also optionally provide power directly to a local load 110, such as a building, vehicle, data center, storage battery, etc.

The operation of the SOFCS 108 is governed by a SOFCS controller 116, such as a general or specific purpose computer or a dedicated logic device. Controller 116 may control one or more SOFCS 108.

The SOFCS 108 is in fluid communication with at least one of a fuel source 122 and a fuel pipeline 124. The fuel source 122 may comprise a fuel storage vessel, such as a hydrogen or hydrocarbon fuel vessel, such as a natural gas tank. Source 122 provides suitable hydrocarbon or hydrogen fuel that the SOFCS 108 consumes during operation in fuel cell mode. The pipeline 124 may comprise a natural gas, hydrogen or other fuel pipeline which provides fuel to the SOFCS 108 instead of or in addition to the source 122.

If the SOFCS 108 is a SORFCS, then the SORFCS may provide a hydrogen outlet stream to the source 122 and/or to the pipeline 124 while operating in electrolyzer mode, as described for example in U.S. patent application Ser. No. 10/446,704, filed on May 29, 2003, now U.S. Pat. No. 7,482,078, and incorporated herein by reference in its entirety.

The grid control center 114 and optionally the SOFCS controller 116 are designed to monitor grid frequency by virtue of one or more frequency transducers 112A, 112B. Additionally, the grid control center 114 may be in communication with the SOFCS controller 116 via a signal transmitter 118 so as to provide the SOFCS controller 116 with grid frequency information in addition to or instead of grid frequency provided by a transducer 112B directly to SOFCS controller. This signal transmitter 118 may be embodied by a telephone or internet line, or wireless link, for example. In the alternative embodiment, the SOFCS 108 is enabled to support the operational stability of the power grid 102 by modulating its power (i.e., electricity) output to the grid in response to changes in grid frequency without requiring any communication with the grid control center 114 by using the dedicated transducer 112B. The SOFCS controller 116 additionally comprises a computing unit that executes the decision logic required to advantageously modulate SOFCS operation.

Figure 2:
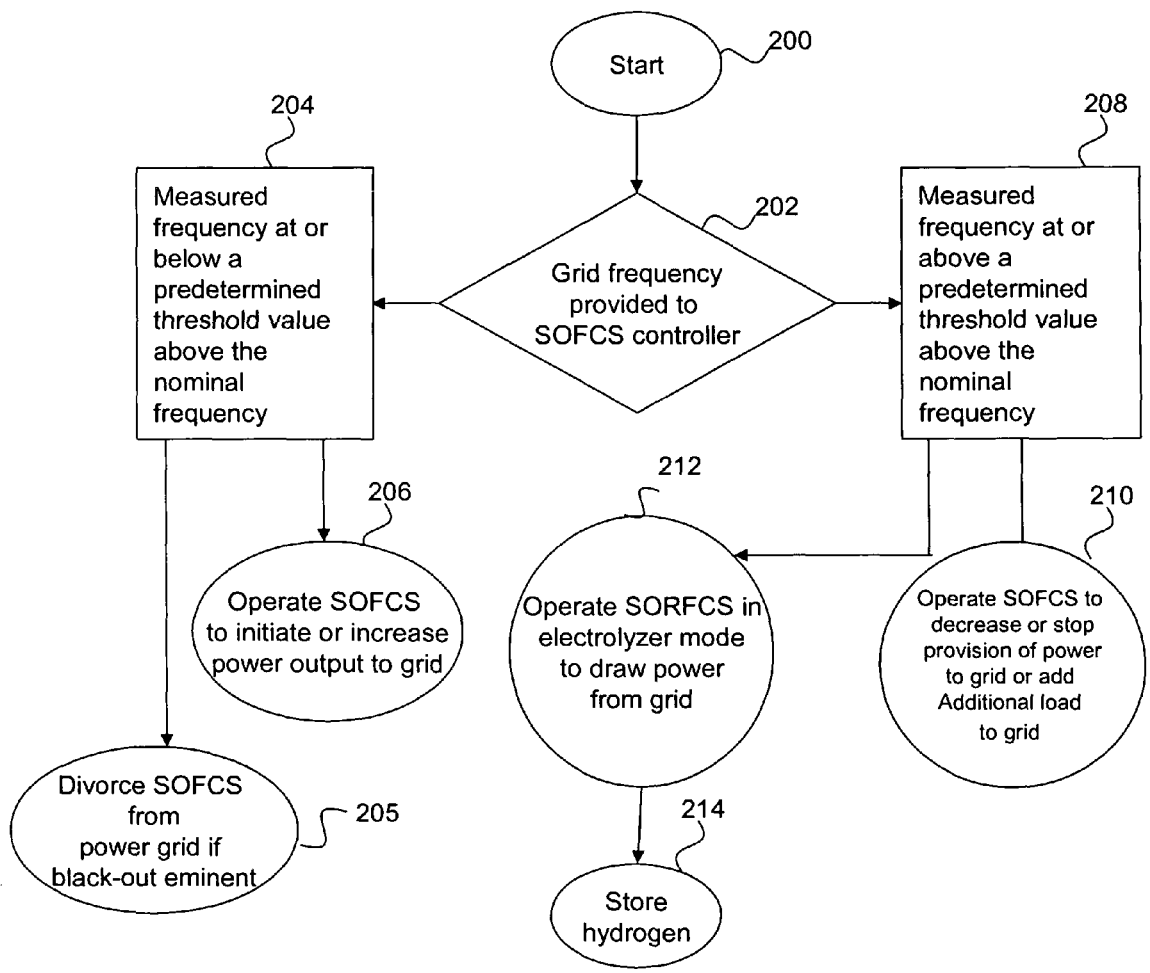
FIG. 2 is a flow diagram depicting an operation scheme for the SOFCS according to an embodiment of the invention.

FIG. 2 is a flow diagram depicting an operation scheme for the SOFCS 108 according to one embodiment. At the start point 200, the SOFCS 108 is operating in fuel cell mode at nominal output state that maximizes fuel efficiency. The output power of SOFCS 108 is provided either to grid 102 and/or to the local load 110. As a first step, the actual grid frequency is provided to the SOFCS controller 116 (see step 202). In the event that this measured frequency is at or below a predetermined threshold value below the nominal frequency (rectangle 204), the SOFCS controller 116 commands the SOFCS 108 to either initiate providing power to the grid 102 (if the SOFCS 108 was providing power only to the local load 110) or to increase the amount of power provided to the grid 102 if the SOFCS 108 was already providing power to the grid. For example, the reversible or non-reversible SOFCS may be set to operate in a fuel cell mode at maximum electricity output level designed for the SOFCS (see step 206).

According to another embodiment, when the grid frequency becomes low, the grid control center 114 causes the SOFCS 108 to switch to grid independent operation of a critical load—in order to avoid a possible interruption of the critical load—particularly if the frequency is below a threshold such that a blackout is imminent. (That is, when predetermined criteria for an imminent blackout is met, then forced supporting of local load 110 is performed and the SOFCS 108 is divorced from the power grid 102 intentionally before the interruption occurs) (see step 205). According to one embodiment, it is unlikely that this would ever be done unless a blackout were truly eminent because the critical load (or local load 110) is by plan going to be less than the output capacity of the SOFCS 108. So, forcing this divorce from power grid 102 connect would result in a net loss of output to the power grid 102 at the worst possible time (when there is already not enough power). However, if a utility has a contract to support a critical load with high reliability, this might be the right financial choice. According to another embodiment, this operation may be performed if the critical or local load is for example, a hospital or critical data center.

In the event that the measured grid frequency is at or above a predetermined threshold value above the nominal frequency (rectangle 208), the SOFCS controller 116 commands the SOFCS 108 to decrease the amount of power provided to the grid 102 or to stop providing power to the grid 102 (see step 210). The SOFCS 108 may instead provide power to local load 110.

According to another embodiment, when the power grid 102 frequency is high, (i.e., when there is not enough load on the grid) the grid control center 114 causes SOFCS 108, which for reliability reasons might have been operating divorced from the grid supporting only a critical or local load 110, to parallel with the power grid 102 and reduce output such that there is additional net load on the power grid 102 via a critical or local load 110 (See step 210).

If the SOFCS 108 is a reversible system, then controller may command the SORFCS 108 to operate in the electrolyzer mode to draw power from the grid 102. When SORFCS 108 operates in electrolyzer mode, it draws electric power from the grid to produce hydrogen from supplied water (see step 212). The produced hydrogen flows into the storage vessel (i.e., source) 122 and/or pipeline 124 (see step 214), and may be used during times in which energy consumption is high. Optionally, the pipeline 124 may be painted black to utilize the day-night cycle and function as a solar compressor to compress the fuel for daytime use. In another embodiment, the generator 108 may comprise a wind turbine or another renewable power generator which powers an electrolyzer, such as a solid oxide electrolyzer system and a compressor. This generator can generate hydrogen instead of electricity at night to eliminate power production at night when the grid load is low. During the day, when the grid load is high, the electrolyzer may be inactivated or operated at a lower hydrogen output while the power is provided from the power generator to the grid.

For example, for a U.S. based grid, the predetermined threshold value may be 0.3 Hz and the nominal frequency may be 60 Hz. Thus, if grid frequency drops to or below 59.7 Hz, then step 206 is executed. If the grid frequency rises to 60.3 Hz or above, then step 210 or 212 is executed. These values may be different for grids in countries other than the United States. The frequency measurement and determination may be conducted at predetermined or random time intervals.

Figure 3:
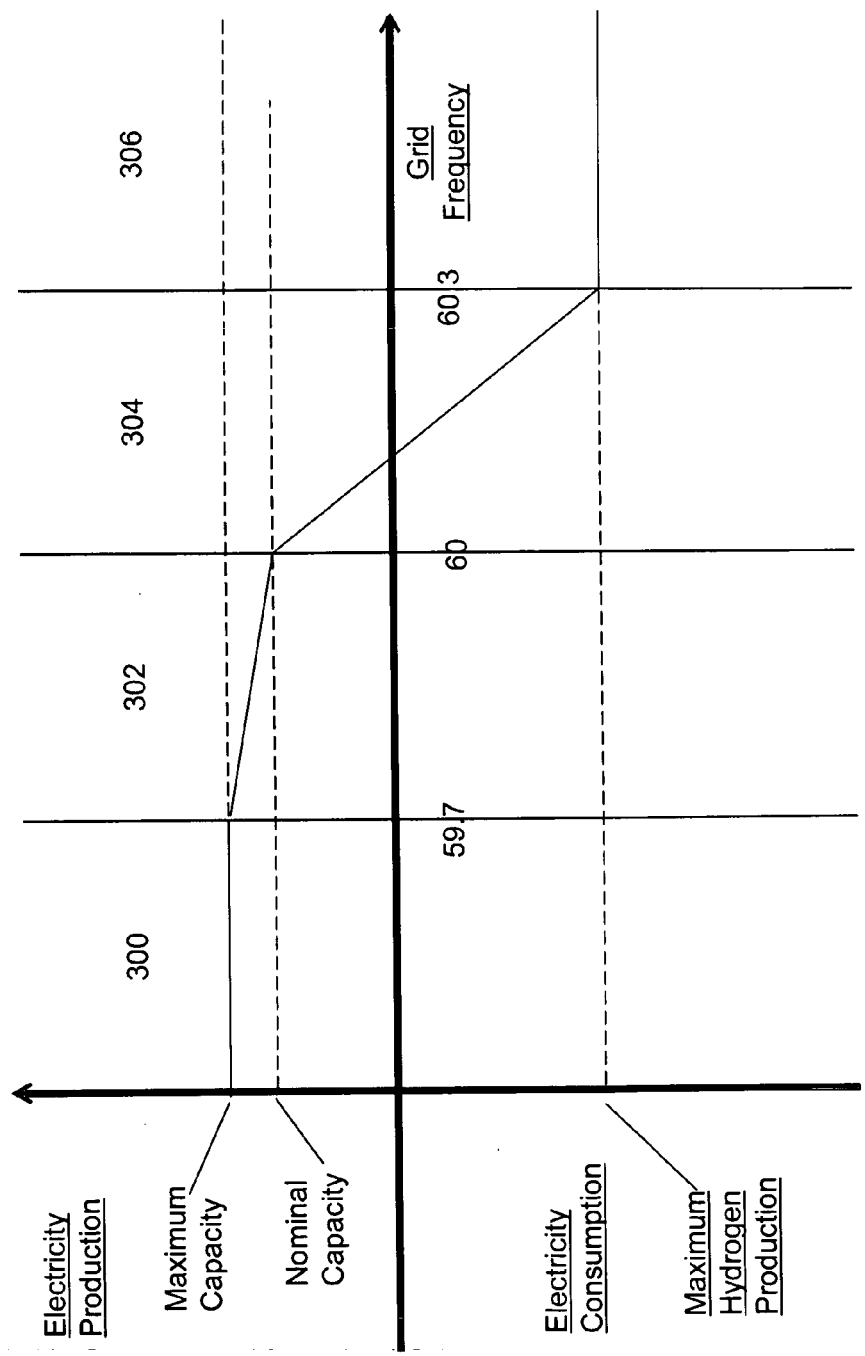
FIG. 3 is a graphical representation of the SOFCS output according to another embodiment of the invention.

In an alternative embodiment (See FIG. 3), the operation state of the SOFCS 108 may be established as a continuous function of electricity output varying with grid frequency. In this embodiment, for grid frequencies lower than 59.7 Hz (region 300), the SOFCS 108 is operating in a fuel cell mode at a maximum designed power output level. For grid frequencies of 59.7 Hz and above, but less than 60 Hz (region 302), the SOFCS 108 power (electricity) output decreases gradually from the maximum value to a nominal power output (such as the power output that maximizes fuel efficiency). At a grid frequency of 60 Hz, the SOFCS 108 is operating in the fuel cell mode at the nominal power output. In region 304, where the grid frequency is above 60 Hz and equal to or below 60.3 Hz, the power output decreases gradually from the nominal value to either zero at 60.3 Hz or to a negative value for a SORFCS indicating maximum electricity consumption and commensurate with electrolysis mode and hydrogen production. For frequency values of greater than 60.3 (region 306), hydrogen production remains constant at a maximum level.

For decreasing grid frequencies (i.e., going right to left in FIG. 3), the power output of the SOFCS 108 moves in the opposite direction (i.e., lower amount of power is drawn from grid and/or increased amount of power supplied to grid).

The system 100 containing a SORFCS is capable of switching from electrolyzer mode to fuel cell mode in less than four seconds, thereby qualifying the power produced in fuel cell mode to be sold to the grid utility as spinning reserve. It advantageously provides for the recycling of excess electrical energy produced during low-consumption periods by conversion of steam to clean-burning hydrogen.

The foregoing description has been presented for purposes of illustration and description. It is not intended to be exhaustive or to be limited to the precise form disclosed, and modifications and variations are possible in light of the above teaching or may be acquired from practice of the disclosure. The above-referenced embodiments were chosen and described in order to explain the principles of the disclosure and as a practical application to enable one skilled in the art to utilize the disclosure in various embodiments, and with various modifications, are suited to the particular use contemplated. It should be understood that the following description is intended to describe exemplary embodiments, and not to limit the claimed subject matter.

What is claimed is:

1. A method of operating a fuel cell system connected to a power grid, comprising:
    determining an instantaneous frequency of the power grid; and
    adjusting the operation of the fuel cell system based on the determined instantaneous frequency.

2. The method of claim 1, wherein the step of adjusting comprises initiating or increasing provision of power from the fuel cell system to the grid if the instantaneous frequency is at or below a predetermined value below a nominal power grid instantaneous frequency.

3. The method of claim 1, wherein the step of adjusting comprises divorcing the fuel cell system from the power grid and providing power from the fuel cell system to a local load if the instantaneous frequency is at or below a predetermined value below a nominal power grid frequency and a blackout is imminent.

4. The method of claim 1, wherein the step of adjusting comprises stopping or decreasing provision of power from the fuel cell system to the grid if the instantaneous frequency is at or above a predetermined value above a nominal power grid frequency.

5. The method of claim 1, wherein the step of adjusting comprises operating the fuel cell system which was previously providing power to a local load in parallel with the grid to add the local load to the grid if the instantaneous frequency is at or above a predetermined value above a nominal power grid frequency.

6. The method of claim 1, wherein the fuel cell system comprises a reversible fuel cell system and the step of adjusting comprises operating the fuel cell system in a fuel cell mode to provide power to the grid if the instantaneous frequency is at or below a predetermined value below a nominal power grid frequency.

7. The method of claim 1, wherein the fuel cell system comprises a reversible fuel cell system and the step of adjusting comprises operating the fuel cell system in an electrolyzer mode to draw power from the grid if the instantaneous frequency is at or above a predetermined value above a nominal power grid frequency.

8. The method of claim 7, further comprising operating the fuel cell system to generate hydrogen and providing the hydrogen to a storage vessel or to a fuel pipeline.

9. The method of claim 1, further comprising detecting instantaneous frequency of the power grid by at least one of a frequency transducer or a grid control center.

10. The method of claim 1, wherein a power output of the fuel cell system is a continuous function of the grid instantaneous frequency.

11. A power distribution system, comprising:
    a power grid, having a nominal power grid frequency;
    a fuel cell system electrically coupled to the power grid; and
    a power grid frequency detector, configured to detect the power grid instantaneous frequency; wherein the fuel cell system is configured to adjust at least one operation parameter based on detected power grid instantaneous frequency.

12. The system of claim 11, wherein the power grid frequency detector is at least one of a frequency transducer or a grid control center.

13. The system of claim 11, wherein the step of adjusting comprises initiating or increasing provision of power from the fuel cell system to the grid if the instantaneous frequency is at or below a predetermined value below a nominal power grid frequency.

14. The system of claim 11, wherein the step of adjusting comprises stopping or decreasing provision of power from the fuel cell system to the grid if the instantaneous frequency is at or above a predetermined value above a nominal power grid frequency.

15. The system of claim 11, wherein the fuel cell system comprises a reversible fuel cell system and the step of adjusting comprises operating the fuel cell system in a fuel cell mode to provide power to the grid if the instantaneous frequency is at or below a predetermined value below a nominal power grid frequency.

16. The system of claim 11, wherein the fuel cell system comprises a reversible fuel cell system and the step of adjusting comprises operating the fuel cell system in an electrolyzer mode to draw power from the grid if the instantaneous frequency is at or above a predetermined value above a nominal power grid frequency.

17. The system of claim 16, further comprising a pipeline to transport hydrogen produced by the fuel cell system in the electrolyzer mode.

18. A power distribution system, comprising:
    a power grid, having a nominal power grid frequency;
    a fuel cell system electrically coupled to the power grid; and
    means for adjusting at least one operation parameter of the fuel cell system based on detected power grid instantaneous frequency.

19. The system of claim 18, wherein the means for adjusting comprises a controller which receives the power grid instantaneous frequency from at least one of a frequency transducer or a grid control center.

20. The system of claim 18, wherein the means for adjusting initiates or increases provision of power from the fuel cell system to the grid if the instantaneous frequency is at or below a predetermined value below a nominal power grid frequency.

21. The system of claim 18, wherein the means for adjusting stops or decreases provision of power from the fuel cell system to the grid if the instantaneous frequency is at or above a predetermined value above a nominal power grid frequency.

22. The system of claim 18, wherein the fuel cell system comprises a reversible fuel cell system and the means for adjusting operates the fuel cell system in a fuel cell mode to provide power to the grid if the instantaneous frequency is at or below a predetermined value below a nominal power grid frequency.

23. The system of claim 18, wherein the fuel cell system comprises a reversible fuel cell system and the means for adjusting operates the fuel cell system in an electrolyzer mode to draw power from the grid if the instantaneous frequency is at or above a predetermined value above a nominal power grid frequency.

24. The method of claim 1, wherein the step of determining the instantaneous frequency comprises determining the frequency at a point in time.

25. The method of claim 1, wherein the step of adjusting the operation of the fuel cell system based on the determined instantaneous frequency comprises increasing provision of power from the fuel cell system when the instantaneous frequency is below a nominal power grid frequency and decreasing or stopping provision of power from the fuel cell system when the instantaneous frequency is above the nominal power grid frequency.

26. The system of claim 11, wherein the instantaneous frequency comprises the frequency at a point in time.

27. The system of claim 11, wherein adjusting the at least one operation parameter comprises increasing provision of power from the fuel cell system when the instantaneous frequency is below a nominal power grid frequency and decreasing or stopping provision of power from the fuel cell system when the instantaneous frequency is above the nominal power grid frequency.

28. The system of claim 18, wherein the instantaneous frequency comprises the frequency at a point in time.

29. The system of claim 18, wherein adjusting the at least one operation parameter comprises increasing provision of power from the fuel cell system when the instantaneous frequency is below a nominal power grid frequency and decreasing or stopping provision of power from the fuel cell system when the instantaneous frequency is above the nominal power grid frequency.

* * * * *